Sept. 9, 1924.
H. MEYER
ARTIFICIAL BAIT
Filed Jan. 29, 1923
1,508,111
Fig. 1.
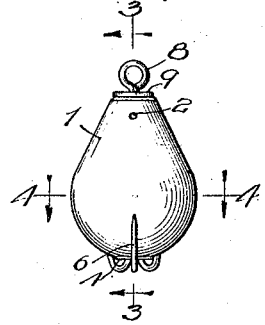
Fig. 2.
Fig. 3.
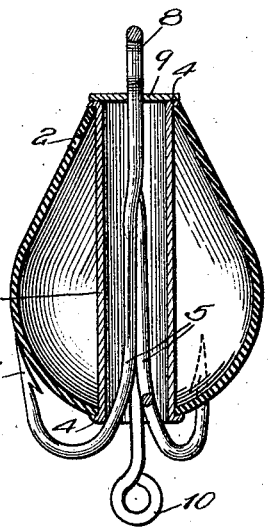
Fig. 5.
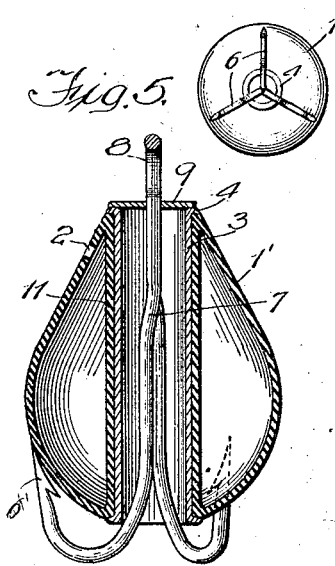
Fig. 4.
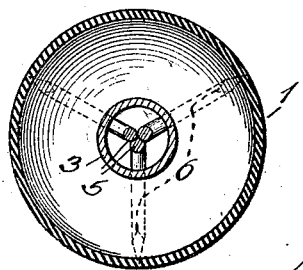
Witnesses.
W. P. Kilroy
Harry R. L. White
Inventor:
Henry Meyer
By Hill & Hill
Atty Patented Sept. 9, 1924.

1,508,111

UNITED STATES PATENT OFFICE.

HENRY MEYER, OF CLINTON, INDIANA.

ARTIFICIAL BAIT.

Application filed January 29, 1923. Serial No. 615,605.

*To all whom it may concern:*

Be it known that I, HENRY MEYER, a citizen of the United States, residing at Clinton, in the county of Vermilion and State of Indiana, have invented certain new and useful Improvements in an Artificial Bait, of which the following is a description.

My invention relates to improvements in an artificial bait or lure for fish, and one of the objects of my invention is to so construct a device of this kind that will be neat and attractive in appearance, particularly inviting to fish, simple, convenient, compact, durable, reliable, efficient and satisfactory for use wherever found applicable.

Another object of my invention is to provide a device of the kind described having means whereby its depth of flotation may be adjustably varied.

Other objects of my invention are to provide a bait of the kind described, which will be weedless, that is, its prongs will normally be protected so as not to entangle in the weeds in which it may be thrown, and if desired, to provide means whereby two or more similar baits may be interconnected to form a tandem or series of baits.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts:

Fig. 1 is a side elevation of my device;

Fig. 2 is a bottom plan view of the same;

Fig. 3 is a section taken substantially on line 3—3 of Fig. 1;

Fig. 4 is a section taken substantially on line 4—4 of Fig. 1; and

Fig. 5 is a section similar to that shown in Fig. 3 and representing a modified form thereof.

In the drawings, wherein I have illustrated the preferred embodiments of my invention, 1 represents the body of the bait, the same being made of any desired size, shape, color, or combination of colors, or ornamented, to suit various conditions and to simulate the appearance of the various natural baits or food sometimes used.

The material of which the bait is formed is preferably of a resilient or compressible nature, as for instance, rubber. The body is preferably reduced in diameter toward one or both ends, and is hollow on its interior and is provided with end openings in alignment and with a small aperture 2 adjacent the upper end thereof. A tube, or bushing, 3 preferably having end flanges 4 to overlie the open ends of the body is inserted therethrough and secured thereto, being held against movement longitudinally thereof in any preferred manner, as by the interlocking of the flanges to the body. Any rigid material may be used for the bushing, the same being preferably of metal.

One or more suitably formed hooks 5 having sharpened prongs 6 at their ends are inserted through the bushing, these prongs being made of any desired material and secured together as at 7 and extended beyond said junction to form an eye 8 for attachment to the line or to a similar bait as will be hereinafter described.

A plate or disk 9 may be arranged across the upper end of the bushing 3 and having an aperture through which the hook extends, this disk serving to prevent relative movement in one direction between the hook and the body of the bait. The other ends of the hooks, as shown, are bent laterally outwardly so as to engage the inner periphery of the bushing, being extended therebeyond and thence reversely bent back so that their prongs 6 will lie substantially parallel to the outer periphery of the body 1 and closely adjacent thereto preferably below the line of greatest diameter of the body. As a matter of fact I have found it preferable to have the prongs 6 lie upon or in contact with the exterior of the body.

It is obvious that when the fish bite into the compressible body member 1 that they will be caught in the prongs 6 and held thereby. When throwing the bait into the water the prongs will not become entangled in the weeds as they are protected by being snugly held against the body below its greatest diameter, but will permit the bait to move freely through the water past the weeds.

Another object of constructing the prongs substantially parallel to the body member and in contact therewith is that in casting, or when the bait is carried in a box, or otherwise, the prongs will not be apt to become entangled with the line or other objects.

If desired, an extension may be formed on the hooks at the prong ends, as for instance at 10, so that the portions 10 and the portions 8 of other baits may be interconnected to form a tandem arrangement or any other number of baits in series may be used.

In the form shown in Fig. 5, the device is similar to that previously described, except that a central tubular wall 11 is formed integral with the body member 1'. The bushing 3 is inserted through this tubular portion 11 and overlies the ends thereof, as in the previously described modification.

The depth of flotation of the bait may be adjustably varied by loading the device with water or other material through the vent or aperture 2, thus changing the weight of the bait.

My invention contemplates a weedless bait, which is floatable, and in which the specific gravity may be varied by simple manipulation to regulate the depth of the normal plane of flotation.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. A weedless fish bait comprising a tubular collapsible body, open from end to end, a rigid bushing extending through said opening and forming a chamber within said body between the opposed walls of said body and bushing, and a hook inserted through said bushing and prevented against longitudinal movement therein, the prongs of said hook extended outwardly from the center and reversely bent to lie closely adjacent the exterior of said body below its greatest diameter.

2. A fish bait comprising a body of tubular compressible material having an opening therethrough from end to end, a rigid bushing extending through said opening and flanged at its ends to overlie the ends of said body, and a hook inserted through said bushing and prevented against longitudinal movement therein, the prongs of said hook extended outwardly from the center and reversely bent to lie closely adjacent the exterior of said body.

3. A fish bait comprising a tubular body, a rigid bushing extended therethrough centrally thereof and flanged at its ends to overlie the ends of said body, and a hook inserted through said bushing and prevented against longitudinal movement therein and having its prongs extended outwardly from the center of said bushing at one end and reversely bent to lie closely adjacent the exterior of said ends of said body and provided with means at the other end for securement to a similar bait so that both of said baits may be connected in tandem.

4. A fish bait comprising a hollow body open at its opposite ends, a tube positioned therethrough and flanged thereover to prevent relative movement therebetween, hooks positioned through said tube and having an eye at one end, the other ends of said hooks projecting outwardly laterally of the tube and bent back so that their prongs lie closely adjacent said body, and means for preventing longitudinal movement between said tube and hooks.

In testimony whereof, I have hereunto signed my name in the presence of two subscribing witnesses.

HENRY MEYER.

Witnesses:
EVERETT A. DAVISSON.
JESSE M. WARD.